(12) United States Patent
Williams et al.

(10) Patent No.: US 7,395,428 B2
(45) Date of Patent: Jul. 1, 2008

(54) DELEGATING CERTIFICATE VALIDATION

(75) Inventors: Roy Williams, Redmond, WA (US); Karim Michel Batthish, Seattle, WA (US); Jorge Pereira, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 10/611,277

(22) Filed: Jul. 1, 2003

(65) Prior Publication Data
US 2005/0021969 A1 Jan. 27, 2005

(51) Int. Cl.
*H04L 9/00* (2006.01)
(52) U.S. Cl. ...................................... 713/170
(58) Field of Classification Search ............... 713/155, 713/170
See application file for complete search history.

(56) References Cited

U.S. PATENT DOCUMENTS 5,835,726 A * 11/1998 Shwed et al. ............... 709/229
6,301,658 B1 * 10/2001 Koehler ..................... 713/155

OTHER PUBLICATIONS

Wikipedia Encyclopedia, on line at: http://en.wikipedia.org/wiki/Firewall_(networking). The pages is attached.*

"Delegation Chains Secure up to Constant Length," Masayuki Abe and Tatsuaki Okamoto NTT Laboratories, Nippon Telegraph and Telephone Corporation pp. 144 to 156.

A Look at Some More PKI Design Efforts Mione, A. Digital Systems Report vol. 20, No. 4 p. 15 to 21 Winter, 1998.

* cited by examiner

*Primary Examiner*—Kristine Kincaid
*Assistant Examiner*—Farid Homayounmehr
(74) *Attorney, Agent, or Firm*—Workman Nydegger

(57) ABSTRACT

The principles of the present invention provide for delegating certificate validation. A client computer system sends a certificate validation request to a server computer system over a trusted link. The certificate validation request includes at least enough certificate information for a certificate authority to identify a digital certificate that binds a sending entity to a private key. The server computer system checks a validation path to determine if the digital certificate is valid and at least one certificate revocation list to determine if the certificate has been compromised. The server computer system sends a certificate status indication to the client computer system over the trusted link. Accordingly, the resources of the server computer system, instead of the client computer system, are utilized to validate a digital certificate. Further, digital certificate validation can be delegated to a server computer system that attempts to pre-validate a digital certificate.

27 Claims, 4 Drawing Sheets

DELEGATING CERTIFICATE VALIDATION

BACKGROUND OF THE INVENTION

1. The Field of the Invention

The present invention relates to electronic messaging, and more specifically, to delegating certificate validation from an end-user computer system to a trusted intermediary computer system.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form computer networks over which the computer systems can communicate electronically to share data. As a result, many of the tasks performed at a computer system (e.g., accessing electronic mail and web browsing) include electronic communication with one or more other computer systems (e.g., via a local area network, a wide area network, and/or the Internet). For example, the path traveled by an electronic mail message transferred from a sending entity to a receiving entity can include a number of different computer systems connected to a number of different computer networks.

An electronic mail message is typically generated by a sending entity at a sending computer system and includes electronic data that is addressed to one or more recipient entities. When the sending entity is satisfied with the content of the electronic message, the sending entity "sends" the electronic message. Sending an electronic message causes the electronic message to be transferred from the sending computer system (e.g., the sending entity's personal computer) to a sending mail server (e.g., at the sending entity's Internet Service Provider). Subsequently, the electronic mail message is further transferred from the sending mail server (e.g., over the Internet) to one or more receiving mail servers (e.g., at the recipient entities' Internet Service Providers) that correspond to the one or more recipient entities.

From time to time, a recipient entity can use a receiving computer system (e.g., the receiving entity's personal computer) to access electronic mail messages stored at a receiving mail server. A recipient entity enters credentials (e.g., electronic mail address and password) at the receiving computer system that are then transferred from the receiving computer system to the receiving mail server. When appropriate credentials are received at the receiving mail server, the receiving mail server transfers electronic messages corresponding to the recipient entity's electronic mail address to the receiving computer system. The receiving entity can then view the transferred electronic messages at the receiving computer system.

Communication links that connect computer systems involved in the transfer of electronic mail messages often exist in a web configuration (e.g., the Internet), where any one of a number of different combinations of communication links can be used for transferring an electronic mail message between two computer systems. This is beneficial as it provides some level of redundancy. That is, when one communication link fails, a number of other communication links may still provide communication between computer systems. To further facilitate efficient electronic communication between computer systems, many communication links, especially those on the Internet, are made publicly available. That is, if a computer system is able to access such a network, the computer system inherently has access to all the public communication links connected to the network. This promotes free flow of information between computer systems (and their users) without significant restraints of the type of data that can be transferred in an electronic mail message.

Due at least in part to the ease and efficiency of electronic mail, the number and diversity of entities that use electronic mail is quite large. However, the accessibility of public communication links provides a malicious user with an avenue to intercept and alter an electronic mail message as the electronic mail message is transferred between computer systems. In some cases, such as, for example, when transferring news items or other public information, the risk may be tolerable since this type of data is already public and verifiable via other mechanisms. However, in a large number of other cases, such as, for example, when sending financial or sensitive personal information, the risk of unauthorized alteration of an electronic mail message may be unacceptable. Further, there is always some risk of a malicious user impersonating (e.g., by spoofing a domain name) a sending entity to make an electronic mail message appear as if it were sent from the sending entity (when in fact the malicious user sent the electronic mail message).

Accordingly, a sending entity can attach a digital signature to an electronic mail message. A digital signature can be processed by a receiving entity to verify that the contents of an electronic mail message have not been altered and to prove the sending entity M sent the electronic mail message. Digital signatures can be created and verified using public key cryptography, which utilizes mathematically corresponding (but different) keys to create and verify digital signatures. One of the keys, commonly referred to as a "private key", is known only to the signer and is the key used to create a digital signature. The other key, common referred to as a "public key", is more widely known and can be used to verify a digital signature created from a corresponding private key. Although keys of a public/private key pair are mathematically related, it is computationally infeasible to derive a private key from a corresponding public key.

A hash function is also typically used when creating or when verifying a digital signature. A hash function is an algorithm that creates a digital representation or "fingerprint" of an electronic mail message, in the form of a hash value. A hash value is usually much smaller than the electronic mail message but nevertheless is essentially unique to the electronic mail message. Hash functions allow modules that create and verify digital signatures to operate on smaller and predictable amounts of data, while still providing evidentiary correlation to the contents of an electronic mail message.

To generate a digital signature for an electronic mail message, a sending computer system creates a sending side hash value of the electronic mail message. The sending computer system then encrypts the sending side hash value with a sending entity's private key. On the other hand, to verify a digital signature, a receiving computer system creates a receiving side hash value (using the same algorithm used by the sending computer system) of the electronic message. The receiving computer system decrypts the digital signature with the sending entity's public key. This decryption reveals the sending side hash value. When the sending side hash value and the receiving side hash value match, there is a significantly reduced chance that the electronic message was altered during transmission or that the sending entity is being impersonated.

Thus, to verify a digital signature, a receiving entity must have access to a sending entity's public key and have some assurance that it corresponds to the sending entity's private key. However, a public/private key pair has no intrinsic association to a particular entity; it is simply a pair of numbers. Accordingly, a receiving entity must also have access to some reliable information that associates an entity with a public/private key pair. In networks with many-to-many architectures, such as, for example, the Internet, where a significant number of transactions can occur through electronic mail, dissemination of this reliable information can be problematic.

Accordingly, many entities rely on trusted third parties, commonly referred to as "certificate authorities", to issue and associate an entity with a specific public key (and thus, although not divulged to potential recipient entities, also the corresponding private key). To associate an entity with a public/private key pair, a certificate authority issues a certificate, an electronic record that associates an entity with a public key. Thus, a certificate effectively binds a public/private key pair to a particular entity. A recipient of a certificate can use the public key listed in the certificate to verify that a digital signature was created with a corresponding private key (and thus also verify a sending entity). When a public key from a certificate is successfully used to verify a digital signature, a recipient entity has increased assurance that the corresponding private key was held by the entity named in the certificate.

To assure both the integrity and authenticity of a certificate, the issuing certificate authority digitally signs the certificate. The certificate can then be verified using the public key of the certificate authority, as provided in a certificate issued and signed by another certificate authority. When appropriate, the integrity and authenticity of the certificate from the other certificate authority can be verified using the public key of the other certificate authority, as provided in a certificate issued and signed by yet another certificate authority. Accordingly, to verify a digital signature, a recipient entity may verify a number of certificates in a certificate chain, until the recipient entity is satisfied as to the integrity and authenticity of the electronic mail message (e.g., when a root certificate indicates that a certificate can be trusted).

Verifying a digital signature can include verifying certificates in a hierarchical arrangement of certificate authorities (e.g., of an X.500 directory). In such an arrangement, higher level certificate authorities provide certificates that can be used to verify the certificates of lower level certificate authorities. At the top of the hierarchy can be a certificate authority (a root certificate authority) that is explicitly trusted. Accordingly, a verifying entity can "walk a chain" of certificate authorities from a lower level certificate, up a hierarchy, until the verifying entity validates a self-signed certificate (the root certificate).

When issued, a certificate typically includes a period of validity, before and after which the certificate is typically not considered valid by the issuing certificate authority. Thus, a receiving computer system can indicate to a recipient entity when a sending entity's certificate is considered not valid. Before a period of validity begins or after a period of validity expires, a verifier has decreased assurance that a corresponding private key held by the sending entity can be trusted.

Further, before expiration of a certificate, it may be that a corresponding private key is compromised or that a certificate authority decides a corresponding entity can no longer be trusted. For example, a malicious user may gain access to an entity's computer system and access (e.g., export) any private keys stored at the computer system. Thus, there is always some possibility of receiving a digital signature associated with a non-expired but compromised certificate. A malicious user could impersonate an entity using a C compromised private key corresponding to the compromised certificate. Unfortunately, based solely on information contained in a non-expired certificate, a receiving entity has no way to know if the trustworthiness of the non-expired certificate has been compromised.

Accordingly, a certificate authority may maintain a Certificate Revocation List ("CRL") that, depending on the desired configuration, includes non-expired certificates that have been revoked (or suspended) by the certificate authority. A recipient computer system can access a CRL (e.g., by downloading the CRL) for a certificate authority to determine if a certificate issued by the certificate authority has been revoked. Thus, upon receiving a digitally signed electronic mail message, a receiving computer system can check an appropriate CRL to determine if a certificate corresponding to the sending entity has been revoked.

The receiving computer system typically checks an appropriate CRL (as opposed to offloading the checking to an intermediary computer system) so as to mitigate the possibility of CRL data being intercepted and altered. Further, when a certificate issued from an intermediate certificate authority to an issuing certificate authority is compromised; all the certificates issued by the issuing certificate authority are also considered compromised. Thus, similar to validation of a certificate, a receiving entity may have to check a chain of CRLs to determine if a certificate has been compromised. That is, each CRL is signed by an issuer certificate. To check the validity of the issuer certificate, its parent issuing certificate and CRL must be also validated. This continues until a root certificate is reached that is explicitly already trusted by the receiving user.

The list of certificates revoked by a certificate authority can change, such as, for example, when additional certificates are revoked and/or revoked certificates expire. Accordingly, at a specified time interval selected by the certificate authority, the certificate authority can publish a new CRL. However, since new CRLs are published at specified time intervals (as opposed to continuous updates), there is always some chance that a revoked certificate is used after it has been revoked but before the revocation has been published in a CRL. When the specified time interval is large and/or a certificate authority manages a significant number of certificates, the chance of a revoked certificate being used before publication in a CRL increases. Further, even if a certificate authority were to publish a new CRL at the precise time each certificate is revoked, the certificate authority may have no way to control the frequency with which computer systems that use the CRL are updated.

Further, depending in part on the number of certificates issued and the security implemented by a certificate authority, a CRL can become relatively large, for example, in the hundreds of megabytes. Thus, frequently publishing a new CRL can consume a significant amount of computer system and bandwidth resources at a certificate authority. Further, checking a CRL can consume substantial computer system and bandwidth resources of a computer system attempting to validate a digital signature. During validation of a signature, the computer system checks a CRL to determine if a certificate corresponding to a sending entity has been revoked. When a CRL is relatively large, the computer system can spend a significant amount of time and resources accessing and scanning a CRL. Further, the computer system may be required to access and scan a number of CRLs corresponding to various levels of certificate authorities in a hierarchy. To alleviate this issue, newer certificate authorities may issue a smaller "delta" CRL that contains only serial numbers of certificates revoked since the last "full" CRL was issued.

However, even with smaller delta CRLs, the size of CRLs essentially prevents constrained resource devices and devices that operate in low bandwidth environments from verifying digital signatures. For example, a mobile phone or pager may altogether lack the resources needed for downloading and/or a scanning a 7 MB CRL. Further, for a computer system to validate a digital signature, the computer system must be configured with the appropriate modules and protocols (e.g., Lightweight Directory Access Protocol). When an organization includes a number of computer systems, configuration of validation modules and protocols can consume a considerable amount of time. Further, many public computer systems that provide Web based access to electronic mail, such as, for example, at public kiosks, may not include appropriate modules and protocols for validating digital signatures. Even when a public computer system does include appropriate modules and protocols, the public computer system may trust a set of incomplete root certificates or may trust certificate authorities that are otherwise unacceptable to an organization. Accordingly, a user accessing electronic mail through a public computer system may have no way to reliably validate a digital signature. Therefore more efficient systems, methods, computer program products, and data structures for validating a certificate would be advantageous.

BRIEF SUMMARY OF THE INVENTION

The foregoing problems with the prior state of the art are overcome by the principles of the present invention, which are directed towards methods, systems, and computer program products for delegating certificate validation from an end-user computer system to a trusted intermediary computer system. A receiving client computer system and a server computer system are network connectable over a trusted link, such as, for example, over a connection that was mutually authenticated using Secure Sockets Layer ("SSL") or Transport Layer Security ("TLS"), or an equivalent link of a trusted network (e.g., behind a firewall). The receiving client computer system receives an electronic message (e.g., an electronic mail message) and a corresponding digital signature. The electronic message includes electronic message data that was sent from a sending entity to the recipient entity.

The digital signature includes at least an encrypted hash value of the message data that was encrypted using a private key of the sending entity. It may be that the digital signature also includes certificate information (for identifying a digital certificate that binds the sending entity to the private key) that was encrypted using the private key of the sending entity. Alternately, the receiving computer system may have previously retrieved a digital certificate that binds the sending entity to the private key from a directory of certificates (e.g., an X.500 directory) or a certificate exchanged through a trusted medium using a corresponding public key or distinguished name for the sending entity.

The receiving client computer system sends a certificate validation request to the server computer system over the trusted link. The certificate validation request includes at least enough certificate information, such as, for example, a hash of the digital certificate that binds the sending entity to the private key, for a certificate authority to identify the digital certificate. Alternately, the certificate validation request can include additional certificate information, such as, for example, the digital certificate serial number, a copy of the digital certificate, or digital certificates of or identifiers to intermediate certificate authorities, that potentially make validation of the digital certificate more efficient.

The server computer system receives the certificate validation request. The server computer system checks a validation path for the digital certificate to determine if the digital certificate is valid. The server computer system may also check at least one certificate revocation list to determine if the digital certificate has been compromised. Thus, the resources of the server computer system, rather than the resources of the receiving client computer system, are utilized to validate a digital certificate that was received at the receiving client computer system. The server computer system may also cache the Certificate Revocation List ("CRL") information or other information (e.g. information indicating that the digital certificate is valid until parent CRLs are updated) that can facilitate subsequent attempts to validate the digital certificate. In some embodiments, the server maintains a hash value of the digital certificate for the period of validity of a corresponding CRL. Thus, subsequent requests from different client computer systems may not require the CRL or other certificate information to be re-downloaded thereby making subsequent validations more efficient for groups of client computer systems that delegate digital certificate validation. Accordingly, a receiving client computer system that lacks requisite resources or that is not configured to validate digital signatures can offload validation to the server computer system.

The server computer system sends a certificate status indication to the receiving client computer system over the trusted link. The certificate status indication indicating the status of the digital certificate, such as, for example, valid, valid and revoked, unknown, etc. The server computer system resolves the certificate validation path back to a site configured root certificate. The receiving client computer system receives the certificate status indication and can present the certificate status indication to the recipient entity.

In some embodiments, a sending client computer system (e.g., a computer system that is to send an electronic mail message) delegates validation of a digital certificate to a server computer system. The sending client computer system receives an indication that a private key is to be used to digitally sign an electronic message. The electronic message includes electronic message data that a sending entity intends to be delivered to a recipient entity. The sending client computer system identifies a digital certificate that binds the sending entity to the private key. The sending client computer system sends a certificate validation request including enough to validate the digital certificate to the server computer system over a trusted connection. The server computer system can check a validation path and as many CRLs as necessary to determine the status of the identified digital certificate. Alternately, the server computer system can issue Online Certificate Status Protocol ("OCSP") or XML Key Management Specification ("XKMS") direct challenges to issuing authorities to determine the validity of the digital certificate.

The server computer system may be a computer system of the issuing certificate authority (e.g., of a corporate public key infrastructure). Thus, the server computer system may have access to certificate status information that has not yet been accessed by or made available to other computer systems. For example, the identified digital certificate may have been recently revoked but the certificate revocation list indicating the revocation has not been downloaded to the recipient entity's computer system.

The server computer system sends a certificate status indication to the sending client computer system over the trusted link. The certificate status indication indicating the status of the digital certificate, such as, for example, valid, valid and revoked, unknown, etc. Based on non-valid and/or revoked status, the sending client computer system (or the server computer system) can prevent the electronic message from being signed using the private key. Accordingly, the potential for transmitting compromised digital signatures can be reduced.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
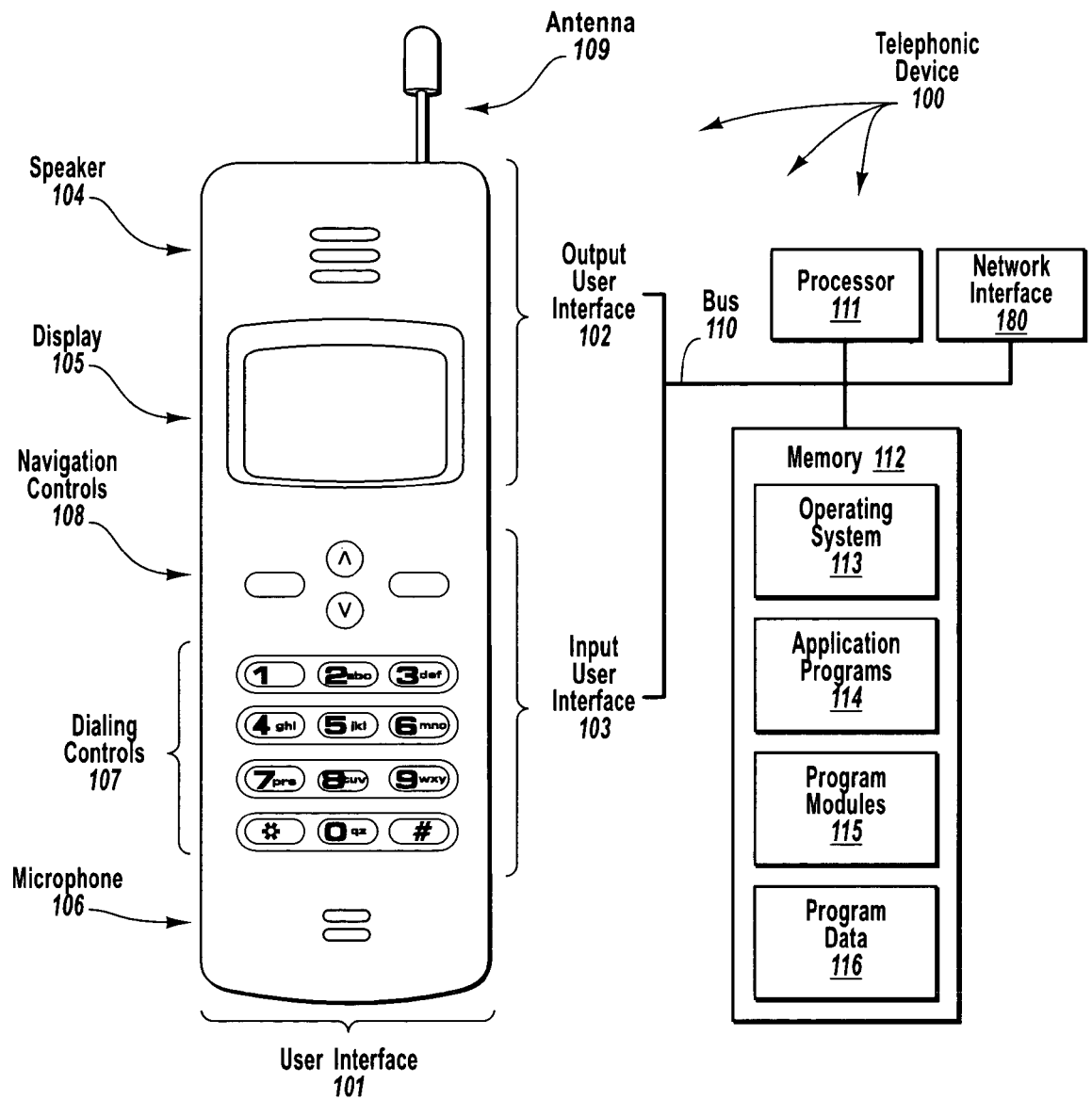
FIG. 1 illustrates a suitable operating environment for the principles of the present invention.

The principles of the present invention provide for delegating certificate validation. A client computer system sends a certificate validation request to a server computer system over a trusted connection. The certificate validation request includes at least enough certificate information for a certificate authority to identify a digital certificate that binds a sending entity to a private key. The server computer system checks a validation path to determine if the digital certificate is valid and checks for revocation to determine if the certificate has been compromised. The server computer system sends a certificate status indication to the client computer system over the trusted connection.

Thus, the resources of the server computer system, rather than the resources of the client computer system, are utilized to validate a digital certificate. Accordingly, a client computer system that lacks requisite resources or permissions or that is not configured to validate digital certificates can offload validation to the server computer system. Further, it may be that digital certificate validation is delegated to a server computer system that attempts to pre-validate digital certificates (possibly even before a digital signature is associated with an electronic message). Accordingly, the potential for transmitting compromised digital signatures can be reduced.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a processor and memory) work together to perform operations on electronic data.

In this description and in the following claims, "certificate information" is defined as information associated with a digital certificate and/or the status of a digital certificate. Certificate information is defined to include data fields of digital certificates (e.g., an X.509 certificate) including: version, serial number, issuer signature algorithm, issuer name, period of validity, subject's name, subject's public key, subject's public key algorithm, extensions, issuer signature, and pointers (e.g., Uniform Resource Identifiers "URIs")) to certificate revocation lists. Certificate information is also defined to include data fields of certificate revocation lists including: version, issuer signature algorithm, issuer name, dates and times of updates, certificate serial numbers, dates of revocation, and issuer signature. Certificate information is also defined to include identifiers, such as, for example, URIs for identifying certificate authorities. It may be that a portion of certification information (or even a complete digital certificate) is represented as a hash value (e.g., a footprint of a certificate) to reduce the resources needed to transfer and store the certificate information.

Those skilled in the art will appreciate that the invention may be practiced in network computing environments with many types of computer system configurations, including routers, gateways, bastion hosts, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired, wireless, or a combination of hardwired and wireless connections) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a telephonic device 100. Telephonic device 100 includes a user interface 101 for allowing a user to input information through an input user interface 103, and review information presented at an output user interface 102. For example, the output user interface 102 includes a speaker 104 for presenting audio information to the user, as well as a display 105 for presenting visual information to the user. The telephonic device 100 may also have an antenna 109 if the telephonic device 100 has wireless capabilities.

The input user interface 103 may include a microphone 106 for inputting audio information into telephonic device 100. In addition, the input user interface 103 includes dialing controls 107 represented by 12 buttons through which a user may enter information. Input user interface 103 also includes navigation control buttons 108 that assist the user in navigating through various entries and options listed on display 105.

Although the user interface 101 has the appearance of a mobile telephone, the unseen features of the user interface 101 may allow for complex and flexible general-purpose processing capabilities. For example, the telephonic device 100 also includes a processor 111 and a memory 112 that are connected to each other and to the user interface 101 via system bus 110. The memory 112 generally represents a wide variety of volatile and/or non-volatile memories and may include types of memory previously discussed. However, the particular type of memory used in the telephonic device 100 is not important to the present invention. Program code means comprising one or more program modules may be stored in memory 1112. The one or more program modules may include an operating system 113, one or more application programs 114, other program modules 115, and program data 116.

Telephonic device 100 is connectable to networks, such as, for example, an office-wide or enterprise-wide computer network, an intranet, and/or the Internet. Telephonic device 100 can exchange data with external sources, such as, for example, remote computer systems and/or remote databases over such a network. Telephonic device 100 includes network interface 180 that can interoperate with antenna 109 to receive data from external sources and/or transmit data to external sources. For example, telephonic device 100 can send electronic messages to and receive electronic messages from other computer systems over a network.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

For example, embodiments of the present invention may also be practiced with a personal computer. A personal computer can be associated with a user input interface that receives information from an input device such as, for example, a keyboard, microphone, or mouse. A personal computer can also be associated with a video output interface that provides a video output signal to external video display devices such as, for example, a color or monochrome computer monitor. A personal computer can also be associated with an audio output interface that provides an audio output signal to external audio output devices, such as, for example, speakers.

A personal computer can also include a magnetic hard disk drive for reading from and writing to a magnetic hard disk. A magnetic hard disk drive and magnetic hard disk can provide nonvolatile storage of computer-executable instructions, data structures, program modules, and other data for the personal computer. For example, a magnetic hard disk can store one or more program modules including an operating system, application programs, and program data.

A personal computer can be connectable to networks, such as, for example, an office-wide or enterprise-wide computer network, an intranet, and/or the Internet. A personal computer can exchange data with external sources, such as, for example, remote computer systems and/or remote databases over such a network. The personal computer can include a network interface, through which the personal computer receives data from external sources and/or transmits data to external sources. The personal computer can send electronic messages to and receive electronic messages from other computer systems over a network.

In accordance with the present invention, certificate validation modules, as well as associated data, including electronic messages, certificates, and certificate revocation lists, may be stored and accessed from any of the computer-readable media associated with telephonic device 100 (or a personal computer). For example, portions of such modules and portions of associated program data may be included in operating system 113, application programs 114, program modules 115, and/or program data 116, for storage in system memory 112. When a mass storage device, such as, for example, a magnetic hard disk, is coupled to telephonic device 100 (or a personal computer), such modules and associated program data may also be stored at the mass storage device. In a networked environment, program modules depicted relative to telephonic device 100, or portions thereof, can be stored in remote memory storage devices, such as, for example, system memory and/or mass storage devices associated with a remote computer system. Execution of such modules may be performed in a distributed environment as previously described.

Figure 2:
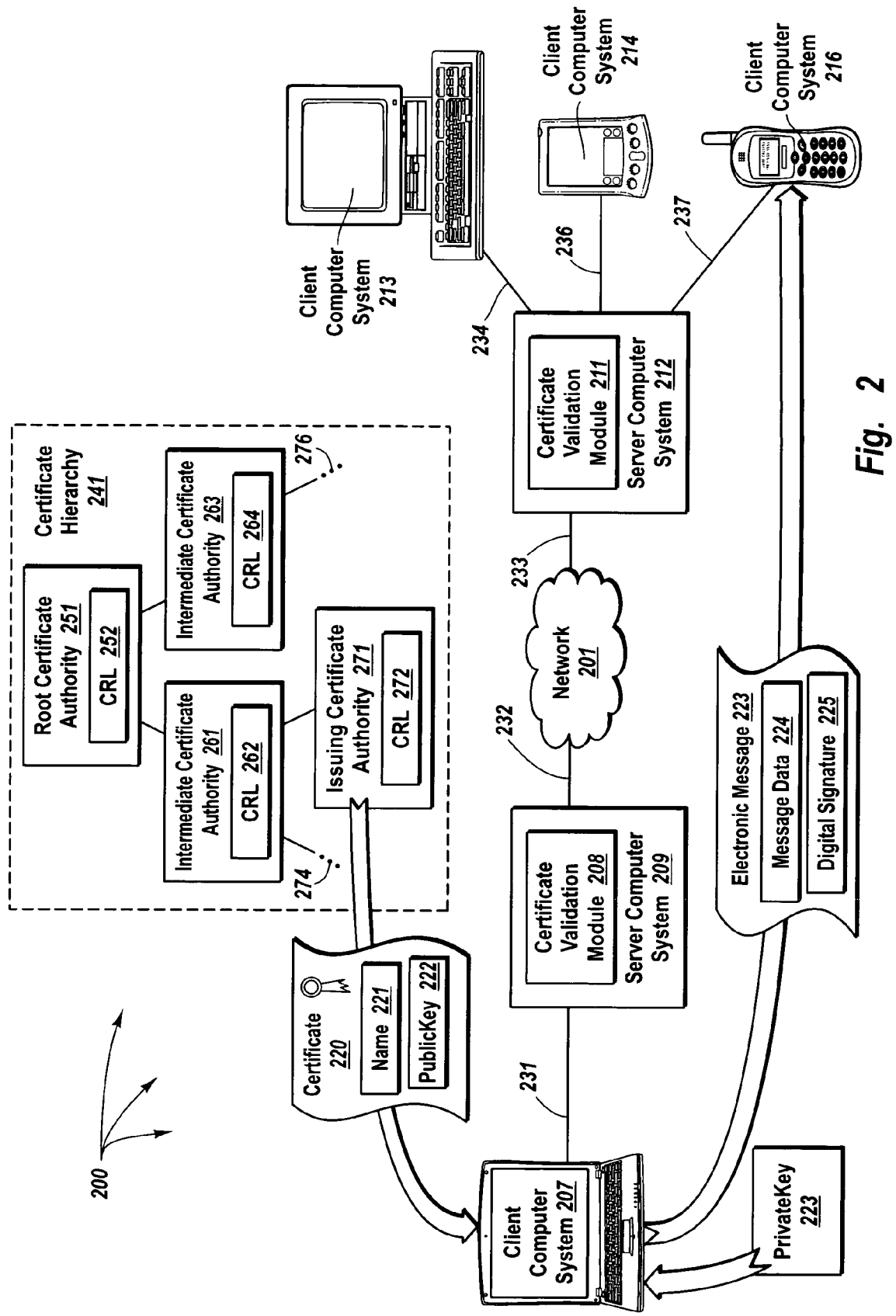
FIG. 2 illustrates an example network architecture that facilitates delegating certificate validation in accordance with the principles of the present invention.

FIG. 2 illustrates an example network architecture 200 that facilitates delegating certificate validation in accordance with the principles of the present invention. Within network architecture 200, certificate hierarchy 241 includes a plurality of certificate authorities (e.g., in an X.500 directory) that maintain certification information for digital certificates. Some of the certificate authorities in certificate hierarchy 241, such as, for example, issuing certificate authority 271, can be issuing certificate authorities. An issuing certificate authority can issue a digital certificate to an entity, such as, for example, to an individual or corporation, that binds the entity to a corresponding public/private key pair.

For example, issuing certificate authority 271 can issue certificate 220 to a user of client computer system 207. Certificate 220 binds the user, as represented in name 221, to public key 222 and private key 223 (which is, for example, stored at client computer system 207). Public key 222 and private key 223 can be keys of a public/private key pair. That is, public key 222 can be used to decrypt data that was encrypted with private key 223 and private key 223 can be used to decrypt data that was encrypted with public key 222.

Other certificate authorities in certificate hierarchy 241, such as, for example, intermediate certificate authorities 261 and 263, can be intermediate certificate authorities. An intermediate certificate authority can issue a digital certificate to another certificate authority (e.g., issuing certificate authority 271) that binds the other certificate authority to a corresponding public/private key pair. Yet other certificate authorities in certificate hierarchy 241, such as, for example, root certificate authority 251, can be root certificate authorities. A root certificate authority can issue a digital certificate to another certificate authority (e.g., to intermediate certificate authority 261 or 263) that binds the other certificate authority to a corresponding public/private key pair. A root certificate authority may be explicitly trusted and can sign issued digital certificates to indicate that the digital certificates can be trusted. Ellipses 274 and 276 represent that certificate hierarchy 241 may include additional intermediate and issuing certificate authorities.

Figure 3:
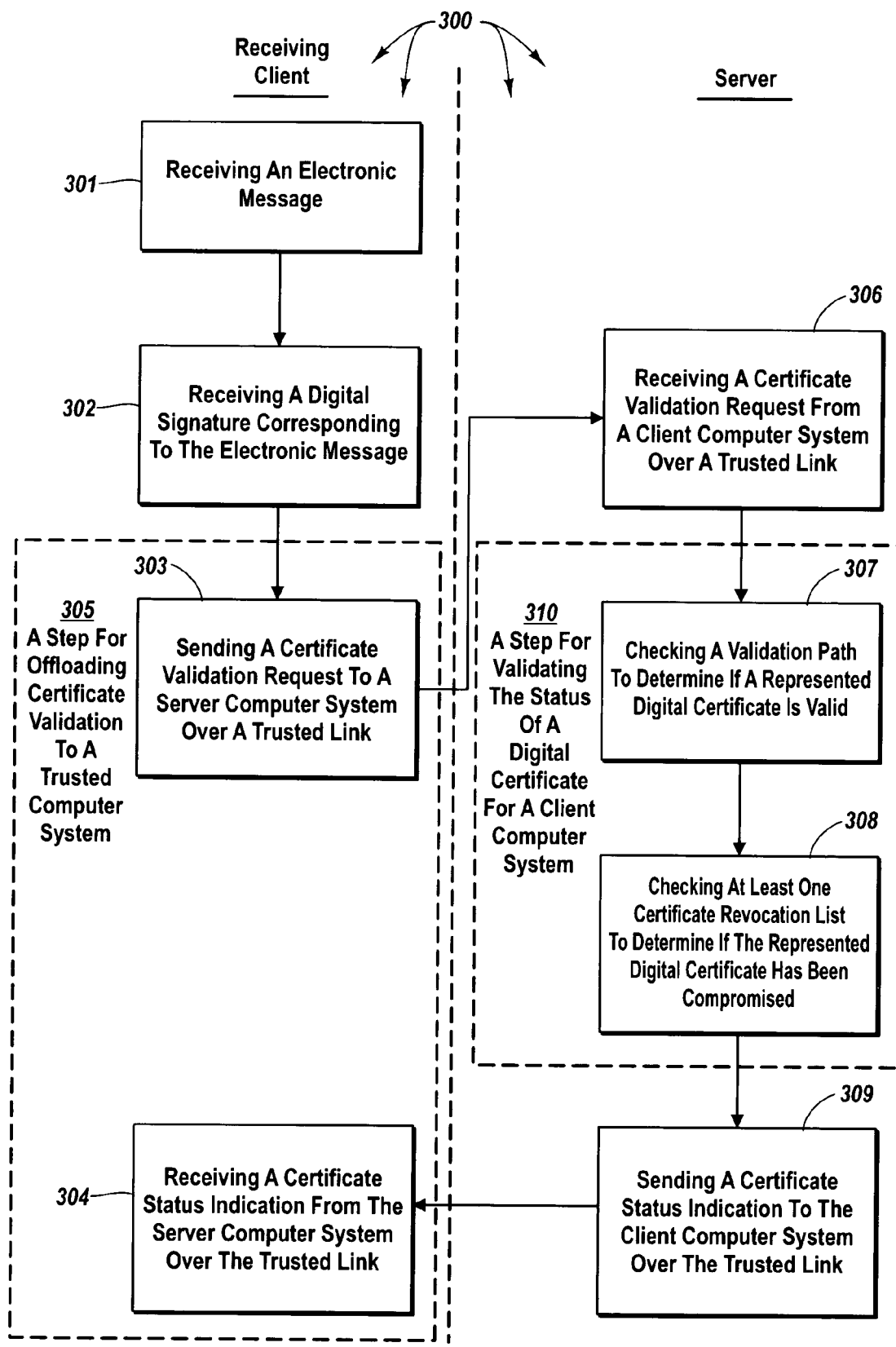
FIG. 3 illustrates an example flowchart of a method for offloading certificate validation from a receiving client computer system to a server computer system in accordance with the principles of the present invention.

FIG. 3 illustrates an example flowchart of a method 300 for offloading certificate validation from a receiving client computer system to a server computer system in accordance with the principles of the present invention. The method 300 will be discussed with respect to the computer systems and certificate authorities depicted in network architecture 200.

The method 300 includes an act of receiving an electronic message (act 301). Act 301 can include a receiving client computer system receiving an electronic message that was sent from a sending entity (e.g., a sending user) to a recipient entity (e.g., a recipient user). For example, client computer system 216 can receive electronic message 225, which includes message data 224, from client computer system 207. Message data 224 can be data that was entered into client computer system 207 by the sending entity. It may be that the sending entity sent electronic message 223 (e.g., an electronic mail message) to a recipient entity that accesses electronic message at client computer system 216. Accordingly, electronic message 223 may be initially transferred to and stored at a messaging server (which may or may not be server computer system 212). When server computer system 212 is a messaging server, electronic message 232 can travel across link 231, through server computer system 209, across link 232, through network 201, and across link 233, for storage at server computer system 212. Subsequently, for example, as a result of the recipient entity requesting their electronic messages, client computer system 216 receives electronic message 223 (via link 237) from the messaging server. A recipient entity may request electronic messages by sending appropriate credentials to the messaging server.

The method 300 includes an act of receiving a digital signature corresponding to the electronic message (act 302). Act 302 can include receiving a digital signature that was generated from a private key. For example, client computer system 216 can receive electronic message 223, which includes digital signature 225, from client computer system 207. Digital signature 225 can be an encrypted hash value of message data 224. That is, message data 224 can be used as input to a hashing algorithm (e.g., SHA-1, MD5, etc.) that outputs a sending side message data hash value (or message digest) essentially unique to message data 224. The sending side message data hash value and private key 223 can then be used as input to a signature algorithm (e.g., RSA, DSA, etc.) that encrypts the hash value (using private key 223) to generate digital signature 225.

It should be understood that a digital signature can be sent in an electronic message that is separate from the electronic message that contains the message data used to generate the digital signature. For example, digital signature 225 could be sent in an electronic message other than electronic message 223. Further, a digital signature may be sent using a messaging technique that differs from the messaging technique used to send message data. For example, message data 244 could be sent in an instant message and digital signature 225 could be sent in an electronic mail message or vice-versa.

After receiving message data and a corresponding digital signature, a receiving client computer system can verify that message data has not been altered. For example, after receiving electronic message 223 (or separately receiving message data 224 and digital signature 225), client computer system 216 can verify that message data 224 was not altered. Client computer system 216 can decrypt digital signature 225 using public key 222. Client computer system 216 may have received public key 222 in a previous electronic message, may have accessed public key 222 from a database of published keys, or may have previously accessed certificate 220 from certificate hierarchy 241. After decrypting digital signature 225, a sending side message data hash value of message data 224 (and possibly also certificate information) is revealed.

Client computer system 216 can generate a receiving side message data hash value. Client computer system 216 provides message data 224 as input to the same hashing algorithm used by client computer system 207 to generate the sending side message data hash value. Client computer system then compares the sending side message data hash value to the receiving side message data hash value. When the sending and receiving side message data hash values are equal, there is a significantly decreased likelihood that messages data 224 was altered. On the other hand, when the sending and receiving side message data hash values are not equal, there is a significantly increased likelihood that messages data 224 was altered.

The method 300 includes a functional, result-oriented step for offloading certificate validation to a trusted computer system (step 305). Step 305 can include any corresponding acts for offloading certificate validation to a trusted computer system. However, in the illustrated example of FIG. 3, step 305 includes an act of sending a certificate validation request to a server computer system over a trusted link (act 303). Act 303 can include a receiving client computer system sending a certificate validation request to server computer system over a trusted link. For example, client computer system 216 can send a certificate validation request to server computer system 212 over link 237.

Link 237 can be viewed as trusted when server computer system 212 and client computer system 216 mutually authenticate to establish a secure connection, such as, for example, a Secure Sockets Layer ("SSL") connection or Transport Layer Security ("TLS") connection. Link 237 may also be viewed as trusted when server computer system 212 and client computer system 216 are included in a network that is protected by security modules, such as, for example, modules of a firewall or bastion host. For example, one or more security modules (not shown) can be included in link 233 to protect server computer system 212 and client computer systems 213, 214, and 216. Accordingly, links 234 and 235 may also be viewed as trusted links.

A certificate validation request can include certificate information representative of a digital certificate. The included certificate information can be at least enough information for a certificate authority to identify the represented digital certificate. A certificate validation request can include certificate information contained in a received digital signature (e.g., in digital signature 225) and/or certificate information stored at a client computer system. For example, if client computer system 216 previously accessed certificate 220, client computer system 216 can include certificate information for C identifying certificate 220 in a certificate validation request. Certificate information included in a certificate validation request can include, for example, a certificate hash value, a certificate serial number, an issuing authority's name, a subject's name, a subject's public key, certificates of certificate authorities in a validation path, and/or identifiers identifying certificate authorities in a validation path.

The method 300 includes an act of receiving a certificate validation request from a client computer system over a trusted link (act 306). Act 306 can include a server computer system receiving a certificate validation request from a receiving client computer system over a trusted link. For example, server computer system 212 can receive a certificate validation request from client computer system 216 over link 237.

The method 300 includes a functional, result-oriented step for validating the status of a digital certificate for the client computer system (step 310). Step 310 can include any corresponding acts for validating the status of a digital certificate for the client computer system. However, in the illustrated example of FIG. 3, step 310 includes a corresponding act of checking a validation path to determine if a represented digital certificate is valid (act 307). Act 307 can include a server computer system checking a validation path to determine if a represented digital certificate is valid. For example, certificate validation module 211 can check certificate hierarchy 241 to determine if certificate 220 is valid.

When issued, a digital certificate is valid for a specified period of validity. The specified period of validity can be a range of time between a "Not Before Date" and a "Not After Date" (i.e., an expiration date). A Not Before Date can be set to the time of issuance or to some time after the time of issuance. For example, a certificate issued on May 5, 2004, can be issued with a Not Before Date of May 7, 2004. Thus, an issued digital certificate may not be valid at the time of issuance. Accordingly, a digital certificate can be non-valid because a period of validity has not yet begun or because a period of validity has expired. If client and server side clocks are in sync, the client computer system can query the server computer system to identify if a certificate is within a period of validity. When a certificate is not within a period of validity, the client computer system may determine that further validation checks, such as, checking CRLs or issuing Online Certificate Status Protocol ("OCSP") or XML Key Management Specification ("XKMS") direct challenges are not appropriate.

Certificate validation module 211 can a check a validation path including issuing certificate authority 271, intermediate certificate authority 261, and root certificate authority 251 to determine if certificate 220 is valid. Certificate validation module 211 can walk the validation path to validate each certificate authority included in the validation path. That is, certificate validation module 211 can check with higher level certificate authorities to verify that lower level certificate authorities are valid.

For example, when issuing certificate authority 271 indicates that certificate 220 is valid, certificate validation module 211 can in turn validate a digital certificate signed by intermediate certificate authority 261 and issued to issuing certificate authority 271 to validate issuing certificate authority 271. Similarly, when issuing certificate authority 271 is valid, certificate validation module 211 can in turn validate a digital certificate signed by root certificate authority 251 and issued to intermediate certificate authority 261 to validate intermediate certificate authority 261. When intermediate certificate authority 271 is valid, certificate validation module 211 may also validate a digital certificate signed by root certificate authority 251 and issued to root certificate authority 251 to validate root certificate authority 251. When each digital certificate in the validation path is valid (i.e., at the time validation is performed each digital certificate is within a specified period of validity) certificate 220 can also be viewed as valid.

Alternately, the certificate validation module 211 can issue OCSP or XML Key Management Specification XKMS direct challenges to certificate authorities to determine the validity of certificate 220._It may be that a certificate authority can not identify a digital certificate based on provided certificate information. Thus, the certificate authority may have no way to determine whether or not the digital certificate represented by the certificate information is valid. Accordingly, the certificate authority can return a value indicating that the validity status of a digital certificate represented by the certificate information is unknown.

Step 310 also includes a corresponding act of checking at least one certificate revocation list to determine if the represented digital certificate has been compromised (act 308). Act 308 can include a server computer system checking at least one certificate revocation list to determine if the represented digital certificate has been compromised. For example, certificate validation module 211 can check certificate hierarchy 241 to determine if certificate 220 has been compromised. Although a digital certificate is valid (i.e., during a specified period of validity), the digital certificate can become compromised for any number of reasons including, unauthorized disclosure of a private key, misrepresentation of identify to a certificate authority, or when one digital certificate supersedes another digital certificate. When a digital certificate becomes compromised, an issuing certificate authority can revoke or suspend the digital certificate.

A certificate authority can publish certificate information (e.g., a digital certificate serial number) identifying revoked and suspended certificates in a corresponding certificate revocation list ("CRL"). For example, certificate authority 271 can publish certificate information identifying revoked or suspended digital certificates in CRL 272. Likewise, intermediate certificate authorities 261 and 263 can publish certificate information identifying revoked or suspended digital certificates in CRLs 262 and 264 respectively. Similarly, root certificate authority 251 can publish certificate information identifying revoked or suspended digital certificates in CRL 252.

Certificate validation module 211 can check CRLs at each of the certificate authorities in certificate 220's validation path. Checking a CRL can include downloading the CRL to server computer system 212. After downloading a CRL, server computer system 212 can cache the CRL so as to increase the efficiency of validating digital certificates in the future. Thus, if a CRL has been checked in the past (e.g., to validate a digital signature received at client computer system 213 or 214), server computer system 212 may check a cached copy of a CRL when validating certificate 220. Having server computer system 212 cache a CRL may be particularly advantageous when a plurality of client computer systems delegate certificate validation to server computer system 212. For example, if server computer system 212 caches CRL 272, any of client computer systems 213, 214, or 216 can validate certificate 220 without having to download CRL 272.

Certificate validation module 211 can check CRL 272 to determine if certificate 220 has been revoked or suspended. Similarly, when certificate 220 is not revoked or suspended, certificate validation module 211 can in turn check CRL 262 to determine if a digital certificate issued to issuing certificate authority 271 has been revoked or suspended. Intermediaries certificates can be included in electronic messages (e.g., electronic message 223) or can be dynamically retrieved when need. Cached intermediary certificates can be utilized when performing validation for any of a plurality of client computer systems. Similarly, when a digital certificate issued to issuing certificate authority 271 is not revoked or suspended, certificate validation module 211 can in turn check CRL 252 to determine if a digital certificate issued to intermediate certificate authority 261 has been revoked or suspended. It may also be that when a digital certificate issued to intermediate certificate authority 261 is not revoked or suspended, certificate validation module 211 also checks CRL 252 to determine if a digital certificate issued to root certificate authority 251 has been revoked or suspended.

If any one of the digital certificates issued in the validation path is compromised, certificate 220 can be revoked or suspended. On the other hand, when none of the digital certificates in the validation path are compromised, certificate 220 may be valid. After checking a validation path and at least one CRL, certificate module 211 can generate a certificate status indication. The certificate status indication can represent a combination of results for different checks performed for a digital certificate. For example, certificate validation module 211 can indicate that digital certificate 220 is valid and non-compromised, non-valid and non-compromised, valid and compromised, non-valid and non-compromised, unknown and non-compromised, or unknown and compromised.

Thus, the resources of the server computer system, rather than the resources of the receiving client computer system, are utilized to validate a digital certificate for a digital signature that was received at the receiving client computer system. Accordingly, a receiving client computer system that may lack requisite resources or that may not be configured to validate digital signatures can offload validation to the server computer system. It may be that a server computer system (e.g., server computer system 212) is configured to validate digital certificates for a number of receiving client computer systems (e.g., client computer systems 212, 214, and 216). Thus, resources and configuration of the client computer systems can differ, while digital signatures received at any of the client computer systems can still be validated.

The method 300 includes an act of sending a certificate status indication to the client computer system over the trusted link (act 309). Act 309 can include a server computer system sending a certificate status indication to the receiving client computer system over the trusted link. For example, server computer system 212 can send a certificate status indication to client computer system 216 over link 237. A certificate status indication can indicate the status of the represented digital certificate. For example, a certificate status indication sent from server computer system 212 can indicate the status (e.g., valid, non-compromised, etc.) of certificate 220.

Step 305 includes a corresponding act of receiving a certificate status indication from the server computer system over the trusted link (act 304). Act 304 can include a receiving side client computer system receiving a certificate status indication from the server computer system over the trusted link. For example, client computer system 216 can a receive certificate status indication from server computer system 212 over link 237. A certificate status indication received at client computer system 216 can indicate the status (e.g., non-valid, compromised, etc.) of certificate 220. A received certificate status indication can be presented to a recipient entity to indicate the trustworthiness of digital signature 225 to the receipt entity. When a digital certificate is valid and non-comprised, there is an increased likelihood that a digital signature generated from the private key that corresponds to the digital certificate can be trusted. On the other hand, when a digital certificate is non-valid and/or compromised, there is a decreased likelihood that a digital signature generated from the private key that corresponds to the digital certificate can be trusted.

Figure 4:
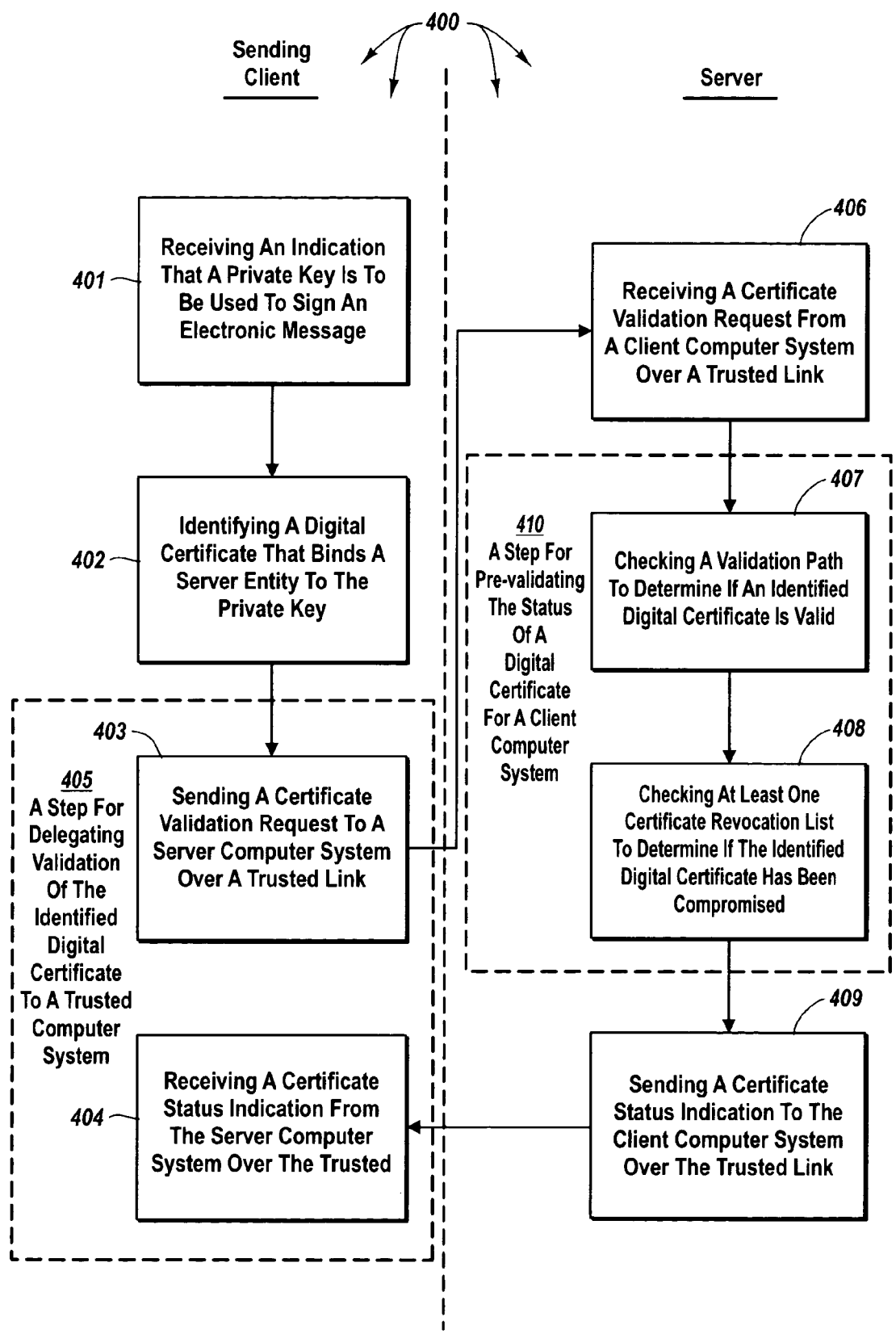
FIG. 4 illustrates an example flowchart of a method for pre-validating a digital certificate in accordance with the principles of the present invention.

In some embodiments, a sending client computer system delegates validation of a digital certificate to a server computer system such that the digital certificate is validated before a digital signature can be used to sign content bound to any recipient entity. FIG. 4 illustrates an example flowchart of a method 400 for pre-validating a digital certificate in accordance with the principles of the present invention. The method 400 will be discussed with respect to the computer systems and certificate authorities depicted in network architecture 200.

The method 400 includes an act of receiving an indication that a private key is to be used to digitally sign an electronic message (act 401). Act 401 can include a sending client computer system receiving an indication that a private key is to be used to digitally sign message data that a sending entity intends to be delivered to a recipient entity. For example, client computer system 207 can receive an indication that private key 223 is to be used to generate digital signature 225. An indication that a private key is to be used can be detected from input data received at an input device (e.g., a mouse or keyboard) coupled to computer system 207.

The method 400 includes an act of identifying a digital certificate that binds a sending entity to the private key (act 402). Act 402 can include a sending side client computer system identifying a digital certificate that binds a sending entity to the private key. For example, client computer system 207 can identify digital certificate 220 as binding the sending entity (as represented by name 221) to private key 223. It may be that certificate 220 is stored at computer system client 207 as a result of certificate 220 being assigned to the sending entity.

The method 400 includes a functional, result-oriented step for delegating validation of the identified digital certificate to a trusted computer system (step 405). Step 405 can include any corresponding acts for delegating validation of the identified digital certificate to a trusted computer system. However, in the illustrated example of FIG. 4, step 405 includes an act of sending a certificate validation request to a server computer system over a trusted link (act 403). Act 403 can include a sending client computer system sending a certificate validation request to server computer system over a trusted link. For example, client computer system 207 can send a certificate validation request to server computer system 209 over link 231.

A certificate validation request can include at least enough certificate information for a certificate authority to identify the identified digital certificate. For example, a certificate validation request sent from client computer system 207 can include certificate information, such as, for example, a serial number, certificate hash value, and/or identifiers for certificate authorities in a validation path, for identifying certificate 220. Link 231 can be viewed as trusted when server computer system 209 and client computer system 207 are mutually authenticated or when server computer system 209 and client computer system 207 are included in a network that is protected by one or security modules (e.g., included in link 232 (not shown)).

The method 400 includes an act of receiving a certificate validation request from a client computer system over a trusted link (act 406). Act 406 can include a server computer system receiving a certificate validation request from the sending client computer system over a trusted link. For example, server computer system 209 can receive a certificate validation request from client computer system 207 over link 231

The method 400 includes a functional, result-oriented step for pre-validating the status of a digital certificate for the client computer system (step 410). Step 410 can include any corresponding acts for pre-validating the status of a digital certificate for the computer system. However, in the illustrated example of FIG. 3, step 410 includes a corresponding act of checking a validation path to determine if an identified digital certificate is valid (act 407). Act 407 can include a server computer system checking a validation path to determine if an identified digital certificate is valid. For example, certificate validation module 208 can check certificate hierarchy 241 to determine if certificate 220 is valid.

Certificate validation module 208 can check a validation path including issuing certificate authority 271, intermediate certificate authority 261, and root certificate authority 251 to determine if certificate 220 is valid. Certificate validation module 208 can walk the validation path to validate each certificate authority included in the validation path. That is, certificate validation module 208 can check with higher level certificate authorities to verify that lower level certificate authorities are valid. Alternately, certificate validation module 208 can issue OCSP or XKMS direct challenges to certificate authorities to determine the validity of certificate 220.

Step 410 also includes a corresponding act of checking at least one certificate revocation list to determine of the identified digital certificate has been compromised (act 408). Act 408 can include a server computer system checking at least one certificate revocation list to determine if the identified digital certificate has been compromised. For example, certificate validation module 208 can check certificate hierarchy 241 to determine if certificate 220 has been compromised.

Certificate validation module 208 can check CRLs at each of the certificate authorities (issuing certificate authority 271, intermediate certificate authority 271, and root certificate authority 251) in the validation path to determine if certificate 220 is compromised. After checking a validation path and at least one CRL, certificate module 208 can generate a certificate status indication. The certificate status indication can represent combination of results for different checks performed for a digital certificate. For example, certificate validation module 208 can indicate that digital certificate 220 is valid and non-compromised, non-valid and non-compromised, valid and compromised, non-valid and non-compromised, unknown and non-compromised, or unknown and compromised.

The method 400 includes an act of sending a certificate status indication to the client computer system over the trusted link (act 409). Act 409 can include a server computer system sending a certificate status indication to the sending client computer system over the trusted link. For example, server computer system 209 can send a certificate status indication to client computer system 207 over link 231. A certificate status indication can indicate the status of the represented digital certificate. For example, a certificate status indication sent from server computer system 209 can indicate the status (e.g., valid, non-compromised, etc.) of certificate 220.

Step 405 includes a corresponding act of receiving a certificate status indication from the server computer system over the trusted link (act 404). Act 404 can include a sending side client computer system receiving a certificate status indication from the server computer system over the trusted link. For example, client computer system 207 can receive a certificate status indication from server computer system 209. A certificate status indication received at client computer system 207 can indicate the status (e.g., non-valid, compromised, etc.) of certificate 220. A received certificate status indication can be presented to a sending entity to indicate the trustworthiness of digital certificate 220 to a sending entity.

Based on non-valid and/or compromised status, the sending client computer system can prevent generation of a digital signature using a corresponding private key. For example, when certificate 220 is compromised, client computer system 207 can prevent digital signatures from being generated with private key 223. Alternately, the server computer system can prevent delivery an electronic message that was digitally signed with a private key that corresponds to a non-valid and/or compromised digital certificate. For example, when certificate 220 is expired, server system 209 can prevent delivery of electronic message 223 to client computer system 216.

It may be that the server computer system is a computer system of the issuing certificate authority (e.g., of a corporate public key infrastructure). Thus, the server computer system may have access to certificate status information that has not yet been accessed by or made available (e.g., through CRLs) to other computer systems. For example, the identified digital certificate may have been recently revoked but the certificate revocation list indicating the revocation has not been downloaded to the recipient entity's computer system. Accordingly, the potential for transmitting compromised digital signatures can be reduced.

On the other hand, based on valid and non-revoked status, the client computer system (or server computer system) can include a validation token in an electronic message or digital signature. For example, client computer system 207 or server computer system 209 can include a validation token in electronic message 223 (or if digital signature 225 is transferred separate from message data 224, in digital signature 225). An included validation token can indicate to a receiving computer system that the status of the digital certificate was valid and non-revoked at the time the server computer system checked. For example, a validation token included in electronic message 223 can indicate to any of client computer systems 213, 214, and 216, that the status of certificate 220 was valid and non-revoked at the time server computer system 209 checked. A validation token may include a timestamp to indicate when the server computer system validated a digital certificate.

Accordingly, a receiving computer system can rely on the validation token, either alone or in combination with receiving side digital certificate validation, as an indication of a digital signature being trustworthy. When a recipient entity relies solely on the validation token, the resources consumed to perform receiving side certificate validation can be reduced. Including a validation token in an electronic message may be particularly advantageous when the electronic message has number recipient entities. For example, when a number of recipient entities rely solely on a validation token (thereby reducing receiving side digital certificate validation) significant resources can be conserved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a sending computer system that is network connectable over a trusted link to a server computer system, the sending computer system being configured to send electronic messages, a method for checking the validity of a digital certificate before using the digital certificate to generate a digital signature based on the digital certificate, the method comprising:
   an act of creating an electronic message including data that a sending entity intends to be delivered to a recipient entity;
   an act of receiving an indication that a private key is to be used to digitally sign the created electronic message;
   an act of identifying a digital certificate that binds the sending entity to the private key prior to digitally signing the message with a digital signature based on the private key;
   an act of sending a certificate validation request to the server computer system over the trusted link, the certificate validation request including certificate information representative of the identified digital certificate, the certificate information being at least enough information for a certificate authority to identify the identified digital certificate;
   an act of receiving a certificate status indication from the server computer system over the trusted link, the certificate status indication indicating the status of the identified digital certificate;
   an act of determining that the certificate status indication indicates that the status of the identified digital certificate is at least one of non-valid and compromised prior to digitally signing the message with a digital signature based on the private key; and
   based on the determination, an act of preventing generation of a digital signature based on the private key for the electronic message that corresponds to the non-valid and/or compromised digital certificate such that resource use for digital signature generation is avoided.

2. The method as recited in claim 1, wherein the act of receiving an indication that a private key is to be used to digitally sign an electronic message comprises an act of receiving input at an input device coupled to the sending computer system.

3. The method as recited claim 1, wherein the act of identifying a digital certificate that binds the sending entity to the private key comprises an act of identifying a certificate stored at the sending computer system.

4. The method as recited in claim 1, wherein the act of sending a certificate validation request to the server computer system over the trusted link comprises an act of sending a certificate validation request that contains a certificate hash value created from the identified digital certificate.

5. The method as recited in claim 1, wherein the act of sending a certificate validation request to the server computer system over the trusted link comprises an act of sending a certificate validation request that contains the identified digital certificate.

6. The method as recited in claim 1, wherein the act of sending a certificate validation request to the server computer system over the trusted link comprises an act of sending a certificate validation request that contains identifiers for one or more certificate authorities included in a validation path for the identified digital certificate.

7. The method as recited in claim 1, wherein the act of sending a certificate validation request to the server computer system over the trusted link comprises an act of sending a certificate validation request over a mutually authenticated connection between the sending computer system and the server computer system.

8. The method as recited in claim 1, wherein the act of receiving a certificate status indication from the server computer system over the trusted link comprises an act of receiving a certificate status indication indicating the status of the represented digital certificate wherein the status of the represented digital certificate is valid and non-compromised, non-valid and non-compromised, valid and compromised, non-valid and non-compromised, unknown and non-compromised, or unknown and compromised.

9. The method as recited in claim 1, further comprising:
   an act of including a validation token in a digital signature generated with the private key.

10. In a sending computer system that is network connectable over a trusted link to a server computer system, the sending computer system being configured to send electronic messages, a method for checking the validity of a digital certificate before using the digital certificate to generate a digital signature based on the digital certificate, the method comprising:
    an act of creating an electronic message including data that a sending entity intends to be delivered to a recipient entity;
    an act of receiving an indication that a private key is to be used to digitally sign the created electronic message;
    an act of identifying a digital certificate that binds the sending entity to the private key prior to digitally signing the message with a digital signature based on the private key; a step for delegating validation of the identified digital certificate to a trusted computer system such that the status of the identified digital certificate can be pre-validated;
    an act of determining that the certificate status indication indicates that the status of the identified digital certificate is at least one of non-valid and compromised prior to digitally signing the message with a digital signature based on the private key; and
    based on the determination, an act of preventing generation of a digital signature based on the private key for the electronic message that corresponds to the non-valid and/or compromised digital certificate such that resource use for digital signature generation is avoided.

11. In a server computer system that is network connectable over a trusted link to a sending computer system, the sending computer system being configured to send electronic messages, a method for checking the validity of a digital certificate before using the digital certificate to generate a digital signature based on the digital certificate, the method comprising:

an act of receiving a certificate validation request from the sending computer system over the trusted link, the certificate validation request including certificate information representative of an identified digital certificate, the certificate information being at least enough information for a certificate authority to identify the identified digital certificate;

an act of checking a validation path to determine if the identified digital certificate is valid prior to digitally signing the message with a digital signature based on a private key;

an act of checking at least one certificate revocation list to determine if the identified digital certificate has been compromised;

an act of sending a certificate status indication to the sending computer system over the trusted link, the certificate status indication indicating the status of the identified digital certificate; and if the identified digital certificate has been compromised, an act of preventing generation of a digital signature based on the private key for the electronic message that corresponds to the non-valid and/or compromised digital certificate such that resource use for digital signature generation is avoided.

12. The method as recited in claim 11, wherein the act of receiving a certificate validation request from the sending computer system over the trusted link comprises an act of receiving a certificate validation request over a mutually authenticated connection between the server computer system and the sending computer system.

13. The method as recited in claim 11, wherein the act of receiving a certificate validation request from the sending computer system over the trusted link comprises an act of receiving a certificate validation request that includes a certificate hash value for the identified digital certificate.

14. The method as recited in claim 11, wherein the act of receiving a certificate validation request from the sending computer system over the trusted link comprises an act of receiving a certificate validation request that includes the identified digital certificate.

15. The method as recited in claim 11, wherein the act of receiving a certificate validation request from the sending computer system over the trusted link comprises an act of receiving a certificate validation request that includes identifiers for one or more certificate authorities in the validation path for the identified digital certificate.

16. The method as recited in claim 11, wherein the act of sending a certificate status indication to the sending computer system over the trusted link comprises an act of sending the certificate status indication over a mutually authenticated connection between the server computer system and the sending computer system.

17. The method as recited in claim 11, wherein the act of an act of sending a certificate status indication to the sending computer system over the trusted link comprises an act of sending a certificate status indication indicating the status of the identified digital certificate wherein the status of the represented digital certificate is valid and non-compromised, non-valid and non-compromised, valid and compromised, non-valid and non-compromised, unknown and non-compromised, or unknown and compromised.

18. The method as recited in claim 11, further comprising: an act of including a validation token in a digital signature generated with a private key that corresponds to the digital certificate.

19. In a server computer system that is network connectable over a trusted link to a sending computer system, the sending computer system being configured to send electronic messages, a method for checking the validity of a digital certificate before using the digital certificate to generate a digital signature based on the digital certificate, the method comprising:

an act of receiving a certificate validation request from the sending computer system over the trusted link, the certificate validation request including certificate information representative of an identified digital certificate, the certificate information being at least enough information for a certificate authority to identify the identified digital certificate;

a step for pre-validating the status of the identified digital certificate for the sending computer system such that receiving side validation is more efficient prior to digitally signing the message with a digital signature based on the private key; and an act of sending a certificate status indication to the sending computer system over the trusted link, the certificate status indication indicating the status of the identified digital certificate; and if the identified digital certificate has been compromised, an act of preventing generation of a digital signature based on the private key for the electronic message that corresponds to the non-valid and/or compromised digital certificate such that resource use for digital signature generation is avoided.

20. A computer program product for use in a sending computer system that is network connectable over a trusted link to a server computer system, the sending computer system being configured to send electronic messages, the computer program product for implanting a method for checking the validity of a digital certificate before using the digital certificate to generate a digital signature based on the digital certificate, the computer program product comprising one or more physical computer-readable storage media having stored thereon computer executable instructions that, when executed by a processor, cause the sending computer system to perform the following:

create an electronic message including data that a sending entity intends to be delivered to a recipient entity;

receive an indication that a private key is to be used to digitally sign an the created electronic message;

identify a digital certificate that binds the sending entity to the private key prior to digitally signing the message with a digital signature based on the private key;

send a certificate validation request to the server over the trusted link, the certificate validation request including certificate information representative of the identified digital certificate, the certificate information being at least enough information for a certificate authority to identify the identified digital certificate;

receive a certificate status indication from the server computer system over the trusted link, the certificate status indication indicating the status of the identified digital certificate;

determine that the certificate status indication indicates that the status of the identified digital certificate is at least one of non-valid and compromised prior to digitally signing the message with a digital signature based on the private key; and based on the determination, prevent generation of a digital signature based on the private key for the electronic message that corresponds to the non-valid and/or compromised digital certificate such that resource use for digital signature generation is avoided.

21. A computer program product for use in a server computer system that is network connectable over a trusted link to a sending computer system, the sending computer system being configured to send electronic messages, the computer program product for implementing a method for checking the validity of a digital certificate before using the digital certificate to generate a digital signature based on the digital certificate, the computer program product comprising one or more physical computer-readable storage media having stored thereon computer executable instructions that, when executed by a processor, cause the server computer system to perform the following:

receive a certificate validation request from the sending computer system over the trusted link, the certificate validation request including certificate information representative of an identified digital certificate, the certificate information being at least enough information for a certificate authority to identify the identified digital certificate;

check a validation path to determine if the identified digital certificate is valid;

check at least one certificate revocation list to determine if the identified digital certificate has been compromised prior to digitally signing the message with a digital signature based on a private key;

send a certificate status indication to the sending computer system over the trusted link, the certificate status indication indicating the status of the identified digital certificate; and if the identified digital certificate has been compromised, prevent generation of a digital signature based on the private key for the electronic message that corresponds to the non-valid and/or compromised digital certificate such that resource use for digital signature generation is avoided.

22. The method of claim 9, further comprising an act of determining that the digital certificate is valid solely based on the validation token, such that resources consumed to perform receiving side certificate validation are reduced.

23. The method of claim 1, wherein the server computing system is part of an issuing certificate authority.

24. The method of claim 23, wherein the server computing system has access to certificate status information that is unavailable to other computer systems.

25. The method of claim 6, further comprising walking the validation path to validate each certificate authority included in the validation path.

26. The method of claim 25, wherein higher level certificate authorities verify that lower level certificate authorities are valid.

27. The method of claim 1, further comprising an act of preventing additional validation checks including CRL checks, online certificate status protocol initiations, or XMIL key management specification direct challenges.

\* \* \* \* \*